United States Patent [19]
Basso et al.

[11] Patent Number: 5,785,222
[45] Date of Patent: Jul. 28, 1998

[54] ARTICLE HOLDER FOR MOUNTING IN A VEHICLE

[76] Inventors: Paul T. Basso, 341 Vincent Ave.; Donald C. Ritchie, 76 Hart St., both of Lynbrook, N.Y. 11563

[21] Appl. No.: 742,205

[22] Filed: Oct. 31, 1996

[51] Int. Cl.[6] .................................................. B60R 7/00
[52] U.S. Cl. ........................ 224/555; 224/556; 224/312; 224/482
[58] Field of Search .......................... 224/400, 275, 224/276, 482, 483, 539, 560, 926, 543, 312, 556, 555, 550; 248/214, 231.81; D12/415, 416, 417, 419, 420

[56] References Cited

U.S. PATENT DOCUMENTS

| D. 199,462 | 10/1964 | Zack et al. | 224/926 |
|---|---|---|---|
| 2,645,392 | 7/1953 | Gottsegen et al. | 224/926 |
| 2,735,597 | 2/1956 | Treleven | D12/416 |
| 3,986,649 | 10/1976 | Heimstra | 224/275 |
| 4,467,934 | 8/1984 | Hummer | 224/560 |
| 4,726,607 | 2/1988 | White | 224/276 |
| 4,730,760 | 3/1988 | Keller | 224/275 |
| 4,821,931 | 4/1989 | Johnson | 224/926 |
| 4,903,872 | 2/1990 | Henricksen et al. | 224/556 |
| 5,025,919 | 6/1991 | Brinker et al. | 224/482 |
| 5,246,190 | 9/1993 | Swirkal | 224/483 |
| 5,582,376 | 12/1996 | Thompson | 248/214 |

FOREIGN PATENT DOCUMENTS

| 2223935 | 4/1990 | United Kingdom | 224/482 |

*Primary Examiner*—Henry J. Recla
*Assistant Examiner*—Gregory M. Vidovich
*Attorney, Agent, or Firm*—George J. Brandt, Jr.

[57] ABSTRACT

An article holder for mounting in a vehicle includes a panel member carrying pockets and components for holding articles. Two hangers are connected to the panel member at the rear face thereof for supporting it selectively on vehicle structure edges of two different thicknesses for which reason, one hanger extends rearwardly a greater distance the other. The one hanger folds against the panel member rear face when the other hanger is being used to support the holder.

13 Claims, 4 Drawing Sheets

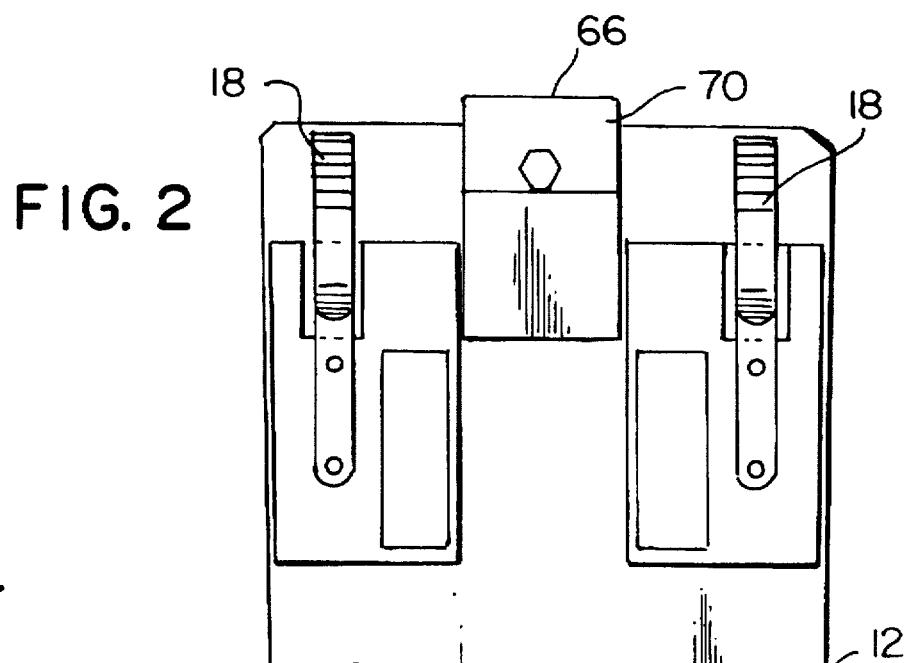
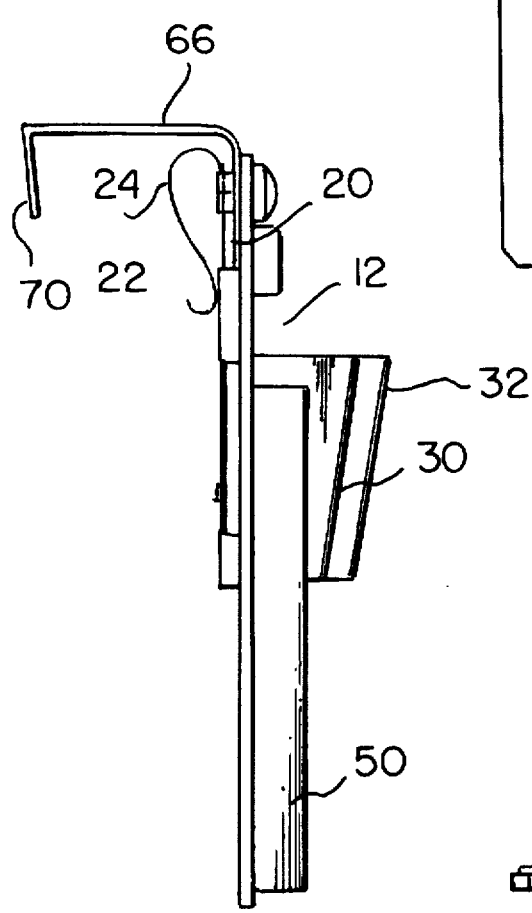
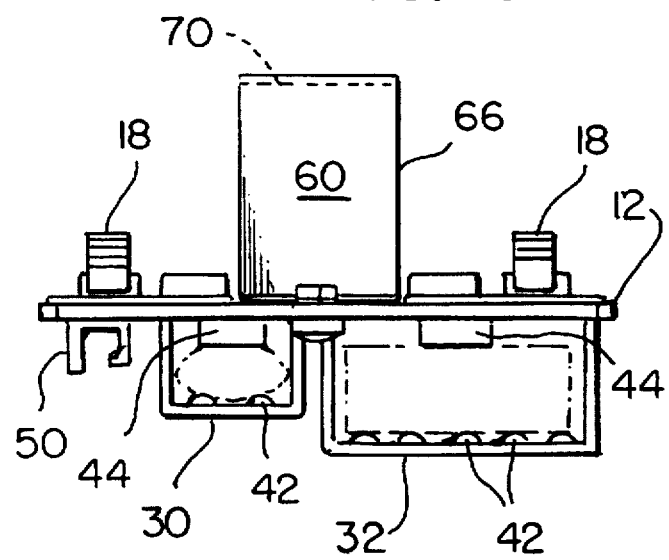

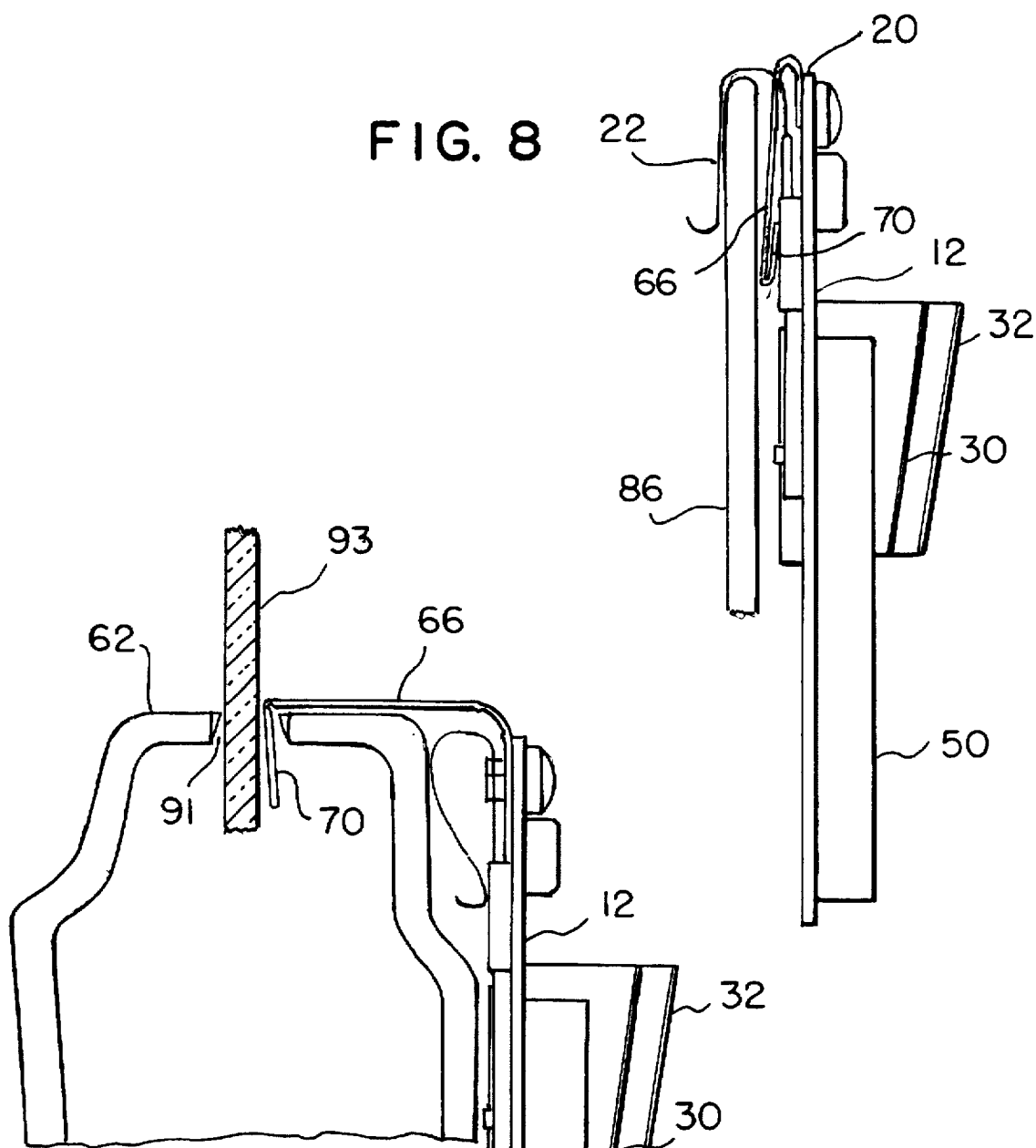

ARTICLE HOLDER FOR MOUNTING IN A VEHICLE

BACKGROUND OF THE INVENTION

The present invention relates to an article holder for mounting in a vehicle and, more particularly, to an article holder that can be hung in a vehicle at mounting locations close by the driver where the mounting structures that a hanger of the holder must span are of greatly different dimensions.

It is a widespread practice for vehicle operators to install a caddy or article holder at a convenient location in the vehicle so that various kinds of articles are at hand and easily retrieved if needed while the vehicle is being operated. This is particularly true for truck drivers who while driving may want to retrieve a snack such as a candy bar, a package of cigarettes, a note pad etc without having to divert the driver's attention to a glove box, side door pocket, or other less conveniently accessed place where a needed article was stored.

A commonly used article holder is one that is mountable with clips on the sun visor above the windshield. This has the advantage of being a most convenient location for the driver to access. On the other hand, if it becomes necessary to fold down the sun visor to counter sun glare, the holder becomes inverted and it is possible for articles to spill from the holder. That drawback is not found when locating a holder at another close by location. For example, the holder can be mounted on the door adjacent the driver, for example, by hanging it from the window sill.

Other mounting locations in a truck cab or driver space of an automobile could be used but it is not practical to mount a holder designed for sun visor mounting on the window sill or to mount a holder designed for window sill mounting on the sun visor. This is because the thicknesses of the several mounting surfaces from which the holder can be hung generally will vary so that a hanger of the holder may fit well and securely on one mounting surface but not so on another mounting surface that a driver finds more convenient to his use need and/or preference.

OBJECTS AND SUMMARY OF THE INVENTION

Accordingly, it is an object of the invention to provide an article holder for a vehicle which overcomes the drawbacks of the prior art.

It is a further object of the invention to provide an article holder for a vehicle which can be mounted at different locations in a vehicle where the vehicle space from which it is to be hung is of different thickness than another space from which it can be hung.

It is a still further object of the invention to provide an article holder for a vehicle which is provided with at least two hangers for hanging it from at least two different thickness surfaces in the vehicle, a hanger associated with a thicker hanging surface being foldable from normal hanger orientation to a nested condition on the holder so as not to be an obstruction to use of a hanger for hanging the holder from a surface of lesser thickness.

In accordance with the invention, the article holder comprises a panel member having a number of article receptive pockets connected to a front face of the panel member. The pockets can be defined by a pair of side walls connected to the panel member, and a front wall extending between side walls. The pockets can be of diminishing cross section from top to bottom of the pocket. Other article retentive structure can be provided on the panel member front face such as a writing instrument receptive frame, and a spring loaded clip for holding flat articles such as a memo pad, a road map, toll receipt etc.

A first hanger unit comprising a pair of clip hooks are carried at and extend rearwardly a first distance from the rear face of the panel member and these each constitute a hanger used to mount the panel member supported from a vehicle structure such as a sun visor. One vertical leg of the clip hook is biased toward the panel member rear face so that when the clip hook is engaged over an edge of the sun visor, the one vertical leg tightly engages against a surface of the sun visor to effect a secured supporting of the panel member therefrom.

At least a second hanger is carried at the rear face of the panel member and extends rearwardly therefrom a greater distance than the first hanger unit. This is such to allow that the holder can be supported from two different vehicle edge structures having the one a lesser thickness, e.g., the sun visor mentioned above and the other having a greater thickness such as a door window sill.

The second hanger is of foldable character so that when the holder is being hung from the lesser thickness edge structure, the second hanger can be folded to an unobstructing nested condition against the rear face of the panel member.

The second hanger has a first part pivoted to the panel member proximal the top of the latter, and a second part pivoted to the first. Normally, the second hanger first part disposes orthogonal to the panel member, and the second part normal downwardly with respect to the first part. When mounting the holder to a sun visor, the second hanger will be folded as the holder mounting is being carried out.

This folding involves, as the holder is being manipulated against a sun visor, the second hanger second part pivoting toward the rear face of the panel member and up under the second hanger first part, the pivoting of the first part then following until the second hanger nested condition is such that the clip hooks are clear to access the edge of the sun visor and the holder pulled down at the front side of the sun visor with the hook clips girding the sun visor to hold it supported.

Pivoting of the second hanger first part to the panel member, and to the second part can be with hinge structure. The hinges can be spring hinges with limited hinging movement, the springs being used to return a pivoted position of the hinge in which a hanger part is folded to, e.g., a hinge position where the hanger part is in erected normal position.

Particularly advantageous is to make the second hanger of a synthetic material such as polyethylene or polypropylene. This allows the hinges to be formed in the second hanger material itself in the form of "living hinges".

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 2 is a rear elevational view of the article holder;

FIG. 3 is a top plan view of the holder;

FIG. 4 is a left side elevational view of the holder;

FIG. 8 is an elevational view in section showing use of the holder as supported from a sun visor; and FIG. 9 is an enlarged elevational view in section depicting mounting of the holder on a door window sill of a vehicle.

DETAILED DESCRIPTION OF THE PREFERRED EMBODIMENT

The article holder of the invention is intended for mounting in proximity to the driver of a motor vehicle at one of several or more locations. The article holder can be mounted on supporting structure having different thicknesses at the option of the driver without his having to make any physical adjustment to the holder to accommodate safe and secure mounting at these different locations.

Figure 1:
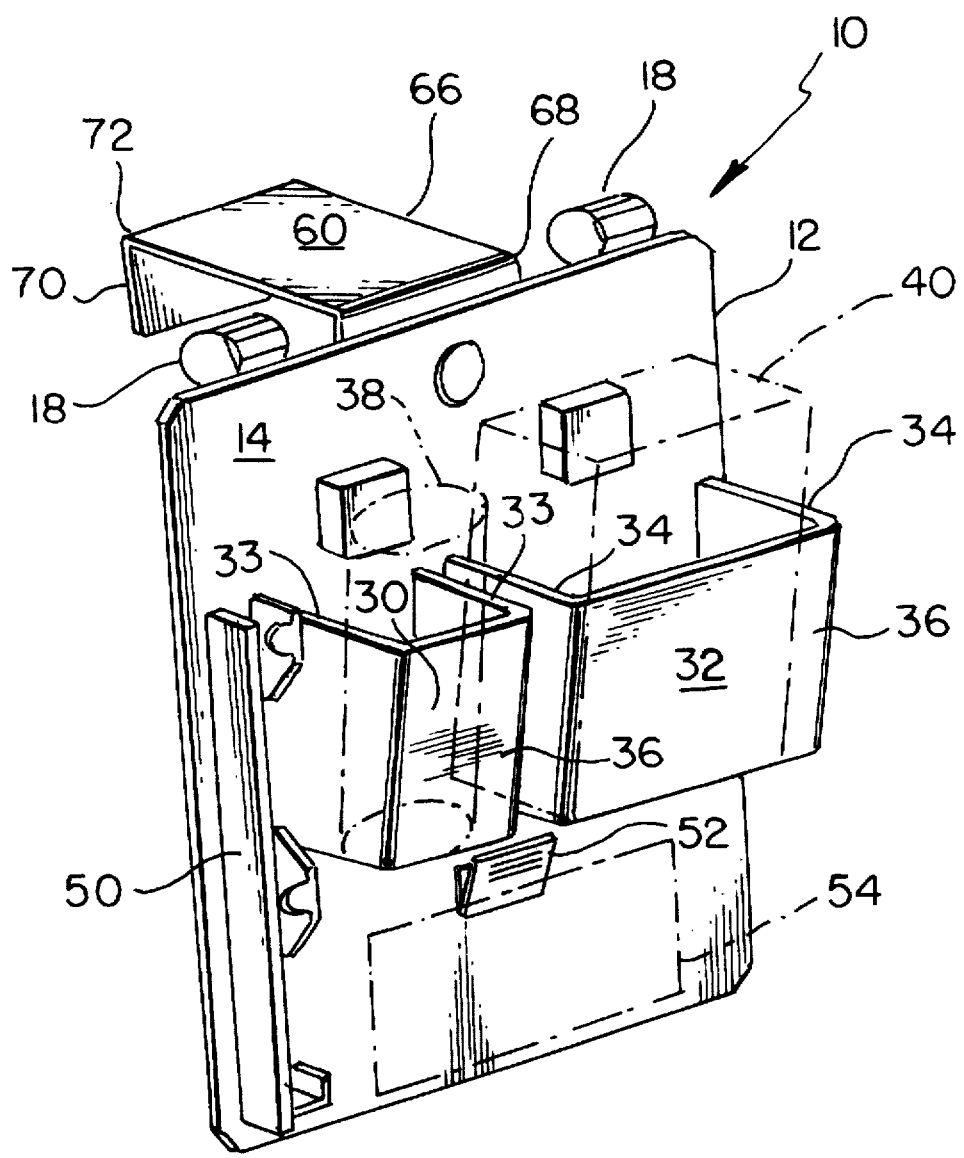
FIG. 1 is a perspective view of an article holder for mounting in a vehicle made in accordance with the invention.

Referring to FIG. 1, the article holder 10 includes an elongated, laterally widened panel member 12 having a front face 14 and a rear face 16. The front face 14 carries a number of article receptive components as will be described below, and hanger means are carried at the rear face, these hanger means being employed to support the panel member from edge structures of different thicknesses.

As can be best seen with reference to FIGS. 2–4, a first hanger is comprised of a pair of clip hooks 18 carried at spaced locations on panel member rear face 16, the clip hooks extending a distance rearwardly of the rear face. Each clip hook 18 has a leg 20 fixed to the panel member rear face 16, and a rearmost leg 22 spaced from leg 20, the two legs 22 being connected at the tops of each by a crosspiece 24. Each clip hook is made of spring steel and configured so that leg 22 is under bias and urged toward the panel member rear face.

A tip end of the leg 22 is rounded rearwardly to facilitate mounting the clip hook over the edge of a vehicle structure, e.g., a sun visor so that when the holder is pulled downwardly on the sun visor, the bias on leg 22 is countered to allow pull down of the holder with leg 22 at the back side of the sun visor and the panel member at the front side. With the holder so mounted, leg 22 maintains bias against the sun visor rear side thereby securely supporting the holder on the sun visor 86 as shown in FIG. 8.

Referring again to FIG. 1, panel member 12 carries a number of article receptive and/or holding components. These include article receiving pockets 30, 32 each comprised of structure connected to the panel member front face 14 as a pair of spaced side walls 32, 34 and a front wall 36 extending between the side walls.

The pockets 30, 32 can have a cross section of diminishing character from top to bottom, this being effected by tapering the side walls from top to bottom. Diminishing pocket size in this way functions to prevent fall through in the pocket of an article which inserted at the larger cross section top part of the pocket will be stopped at a lower smaller cross section part.

Pockets 30, 32 are given by way of example inasmuch as pocket number and size can be varied to particular need. Pockets 30, 32 are depicted by way of example in FIG. 1 as being used to hold a cigarette lighter 38 and a package of cigarettes 40, respectively, these articles being shown in phantom.

As shown in FIG. 3, resilient buttons 42 can be carried at the inside surface of the pocket front walls 36. An article inserted in a pocket 30, 32 will engage these resilient buttons which will exert a friction holding force on the articles to inhibit their removal from the pockets except by deliberate user action.

Resilient stops 44 can be provided on the panel member front face 14 a distance above each pocket to stop a received article at the upper part thereof from making contact with front face 14, this being to position the article for user readily grasping same when removing it from a pocket.

A frame like pocket 50 can extend from the panel member front face to receive an elongated article such as a writing implement. Also, a spring loaded clip 52 can be provided for the purpose of holding a flat article 54 such a memo pad, road map etc on the holder.

Referring again to FIGS. 1–4, the holder 10 includes at least a second hanger 60 carried at the rear face 16 of the panel member and extending rearwardly therefrom for a greater distance than the clip hooks 18 so that the holder can be supported from a vehicle edge structure having a thickness greater than that with which the clip hooks can be used. Such a structure can be the window sill 62 of a vehicle door 64 (FIG. 9) wherein it is seen that the second hanger second part extends downwardly in the door window slot 91 to effect mounted securement of the holder. This mounting can be effected either with the door window 93 up or down.

Second hanger 60 has a first straight run part 66 which is mounted near the top of the panel member in such manner as to be capable of pivoting toward the rear face of the panel member. Such pivoting can be as at 68. A second straight run part 70 of the hanger 60 is pivoted to the first part as at 72.

The second hanger 60 has a normally extended position in which part 66 thereof extends rearwardly substantially orthogonal to panel member 12 and with part 70 extending down from part 66 substantially orthogonal to that part. As used in respect of the last-mentioned orientation of part 70 to part 66, it will be understood that "orthogonal" in such case can include a slight cant of part 70 toward rear face 16 as such is of advantage when initiating pivoting of part 70 in respect to part 66 when mounting the holder on a sun visor and the second hanger has to fold to allow such to occur with use of the first hanger clip hooks 18 as the support component and in such way is to be discussed next.

Figure 5:
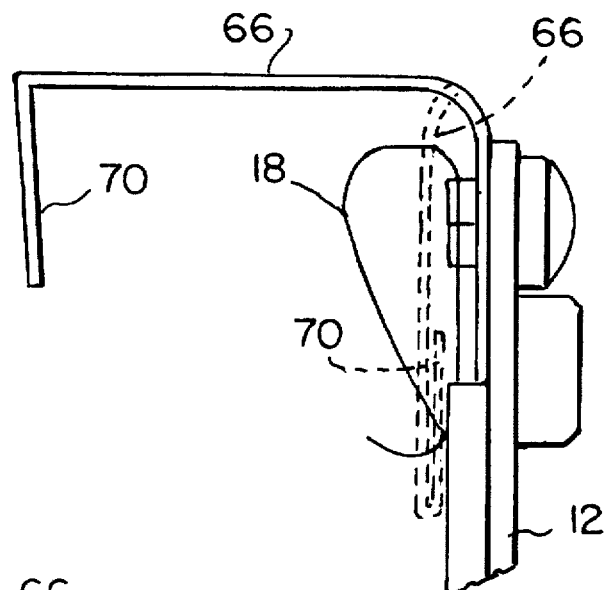
FIG. 5 is a fragmentary elevational enlarged scale view depicting the manner in which the second hanger folds to nested condition at the rear side of the panel to eliminate any obstruction to the first hanger when the first hanger is employed for hanging the holder from a support.

Referring now to FIG. 5, the user can digitally fold second hanger 60 to a nested condition incident and preliminary to mounting the holder on a sun visor. With finger manipulation, the hanger second part 70 is pivoted in the direction of the panel member rear face and up toward the underside of part 66. Part 66 can then be pivoted downwardly with second part 70 close up thereto and until the two parts are brought nested against the panel member rear face.

The sequence of pivoting of hanger parts 66 and 70 from erect to nested position is seen in FIG. 5 with successive pivoted positions of each shown in dotted, dashed, and long and short dashed lines. With the second hanger now folded and user held in that condition, at the front side of the sun visor, the user can pull down on the holder to engage the clip hooks 18 on the edge of the sun visor securing the holder on the sun visor. When the holder is removed from the sun visor, the second hanger will restore to erect condition since the hinging of the first and second parts are designed to effect this as will be described next.

Figure 6:
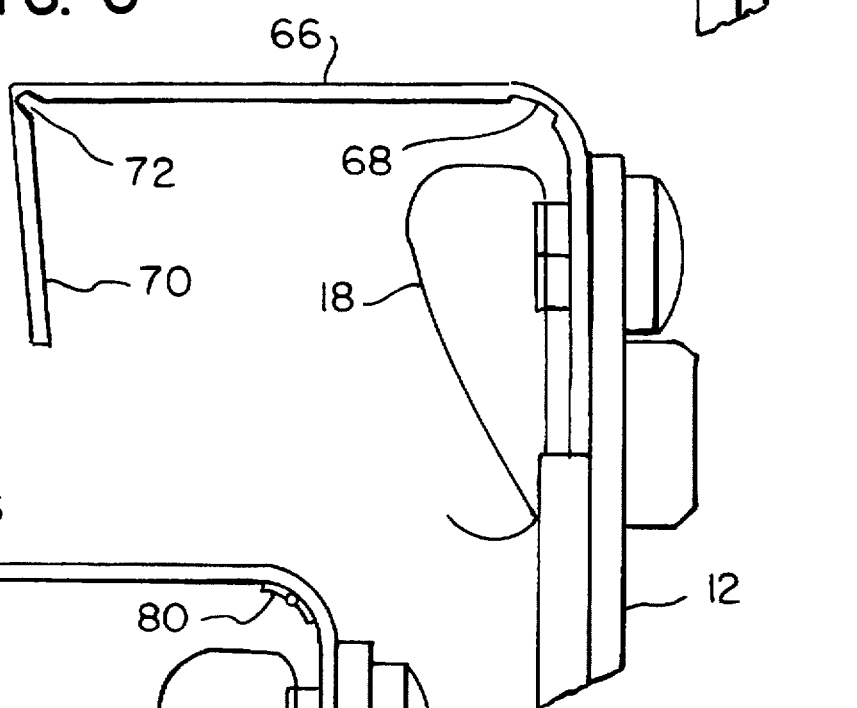
FIG. 6 is an enlarged scale fragmentary elevational view showing details of the living hinge structure of the second hanger.

As seen from FIG. 6, the second hanger parts 66 and 70 can be provided with "living hinges" at 68 and 72. Living hinges are known in the art as exemplified by U.S. Pat. No. 4,124,135 and numerous others. Is this embodiment, the synthetic polymeric material (polyethylene or polypropylene) second hanger has the property to use the living hinge arrangement. The second hanger 60 while normally in erect condition can be folded to nested condition but upon release, the hinging action of the "living hinge" returns parts 66 and 70 to their FIG. 5 solid line positions.

Figure 7:
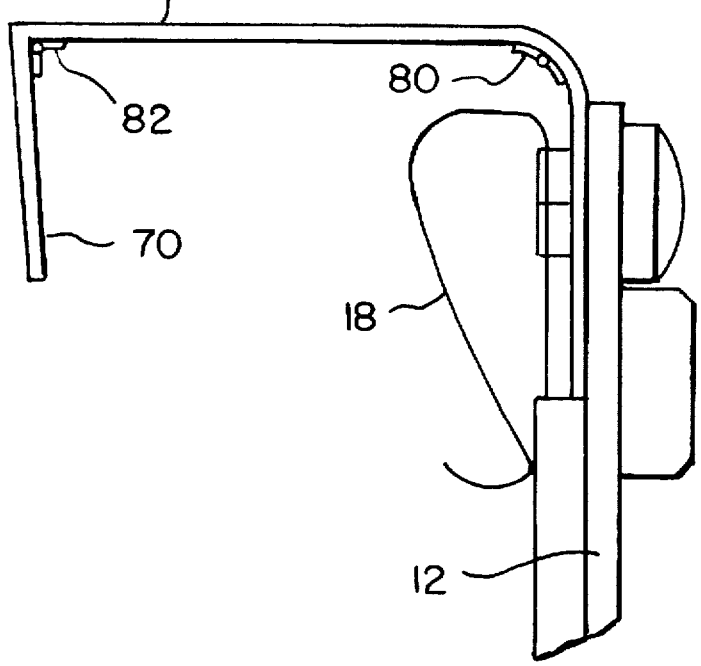
FIG. 7 is a showing similar to FIG. 6 but depicting use of mechanical spring loaded hinges on the second hanger.

Mechanical hinges also can be used. Thus as shown in FIG. 7, hinge 80 connects hanger part 66 at the panel member rear face, and hinge 82 connects part 66 to part 70. These types of hinges are well known and can include a torsion spring to restore the hanger parts from folded to erect condition. Further, stops to limit the extent to which the hinges can pivot can be provided. Thus both hinges can be designed to pivot only about ninety degrees in each of two pivoting directions.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An article holder for mounting in a vehicle, said article holder comprising a panel member, said panel member having article holding means extending frontally from a front face of said panel member, a first hanger extending rearwardly from a rear face of said panel member for supporting said panel member from an edge of a first vehicle structure of a first thickness, and at least a second hanger having a normal position wherein it extends rearwardly from said panel rear face a greater distance than said first hanger extends therefrom for supporting said panel member from an edge of a second vehicle structure having a thickness greater than the thickness of said first vehicle structures, the said second hanger being mounted to the panel such as to fold from its said normal position and nest against said rear panel face when the panel member is supported with the first hanger from the first vehicle structure, said second hanger when the panel member is removed from said first vehicle structure, restoring by self bias induced hinging action to its normal position in a pivoting movement thereof away from the rear panel face.

2. The article holder of claim 1 in which the second hanger includes a first part mounted at the panel member proximal a panel member upper side for pivoting movement relative to said panel member, said second hanger including a second part pivoted to said second hanger first part for pivoting movement relative to said first part, said second hanger having a normally extended position in which the second hanger first part extends substantially orthogonal to said panel member, and said second hanger second part extends substantially orthogonal to the first part thereof and in the direction of a panel member lower side.

3. The article holder of claim 2 in which at least the second hanger is made of a polymeric material, a part of said second hanger first length being connected to said panel member proximal an upper edge of said panel member, said second hanger first length part including a living hinge segment, the second hanger first length being connected to said second hanger second length with a living hinge.

4. The article of claim 1 in which the first hanger is at least one clip hook having a pair of vertical legs and a crosspiece connecting upper ends of said legs, the clip hook girding the first vehicle structure edge when supporting the panel member therefrom with the respective ones of the legs locating at respective ones of opposite sides of said first vehicle structure.

5. The article holder of claim 4 in which the clip hook is a spring clip, a vertical leg thereof which is rearmost located from the panel member rear face being normally bias urged toward said rear panel face.

6. The article holder of claim 1 in which the article holding means comprises at least one article receptive pocket connected to the panel member front face.

7. The article holder of claim 6 in which the article receptive pocket is defined by spaced side walls connected to the panel member front face and a front wall connecting said side walls.

8. The article holder of claim 7 in which the side walls and front wall taper inwardly toward the panel member front face from a top to a bottom of each said wall.

9. The article holder of claim 7 further comprising resilient buttons carried on an inside face of at least one of said walls engagable with an article received in the pocket for exerting a holding friction on the article.

10. The article holder of claim 7 further comprising a stop carried on the panel front side a distance above the pocket for stopping contact of an article received in the pocket with the panel member front face.

11. The article holder of claim 6 further comprising at least a second article receptive pocket connected to said panel member front face.

12. The article holder of claim 6 further comprising structure carried on the panel member front face defining a pocket for reception of a writing implement.

13. The article holder of claim 6 further comprising a spring loaded clip mounted at the panel member front face for holding a flat article to the panel member front face.

* * * * *